United States Patent
Wang et al.

(10) Patent No.: US 7,094,457 B2
(45) Date of Patent: Aug. 22, 2006

(54) COMPOUNDS FOR RECORDING MEDIA AND HIGH-DENSITY OPTICAL RECORDING MEDIA THEREOF

(75) Inventors: Shin-Shin Wang, Hsinchu (TW); Shih-Hsien Liu, Shinjuang (TW); Hui-Ping Tsai, Hsinchu (TW); Chien-Liang Huang, Taoyuan (TW); Wen-Yih Liao, Taichung (TW); Tzuan-Ren Jeng, Hsinchu (TW); Chuen-Fuw Yan, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 24 days.

(21) Appl. No.: 10/446,039

(22) Filed: May 28, 2003

(65) Prior Publication Data

US 2004/0137187 A1    Jul. 15, 2004

(51) Int. Cl.
    *B32B 3/02*    (2006.01)
(52) U.S. Cl. .................... 428/64.1; 428/64.4; 428/64.8; 430/270.14
(58) Field of Classification Search ................ 428/64.1, 428/64.4, 64.8, 913; 430/270.14, 495.1, 945
    See application file for complete search history.

(56) References Cited

U.S. PATENT DOCUMENTS 4,415,621 A * 11/1983 Specht et al. ............... 428/172
2003/0162124 A1 * 8/2003 Akiba et al. ........... 430/270.18

FOREIGN PATENT DOCUMENTS

| JP | 07085499 | * | 3/1995 |
| JP | 07126543 | * | 5/1995 |
| JP | 11-203729 | * | 7/1999 |
| JP | 2000-222772 | * | 8/2000 |
| JP | 2000-263938 | * | 9/2000 |
| JP | 2003-175677 | * | 6/2003 |

* cited by examiner

*Primary Examiner*—Elizabeth Mulvaney
(74) *Attorney, Agent, or Firm*—Bacon & Thomas, PLLC (57) ABSTRACT

A compound used as storage medium of high-density optical disc is disclosed, which has structure represented as following formula:

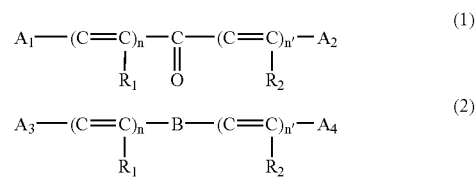

wherein each $A_1$, $A_2$, $A_3$, and $A_4$ independently is selectively substituted aryl or heteroaryl, said aryl or heteroaryl is selectively substituted by one or multiple functional groups; $R_1$ and $R_2$ independently is H, halogen, alkyl or aryl; B is Ar or

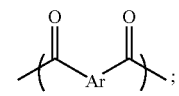

n is an integral ranging from 1 to 4; and n' is an integral ranging from 0 to 4.

3 Claims, 7 Drawing Sheets

COMPOUNDS FOR RECORDING MEDIA AND HIGH-DENSITY OPTICAL RECORDING MEDIA THEREOF

BACKGROUND OF THE INVENTION

1. Field of the Invention

The present invention relates to the compounds for recording media and high-density optical recording media thereof, and, more particularly, to a dye suitable for the recording layer of high-density optical recording media.

2. Description of Related Art

While the high definition television video (HD-TV) and digital camera become more and more popular, the requirements of them are much higher nowadays. For example, the storage capacity of HD-TV for recording a 2-h long movie is about 22 GB, which is much larger than the capacity of DVD-R (4.7 GB). This shows that the traditional DVD-R without enough storage capacity is no longer a good recording medium. So it needs to develop some novel storage media such as HD-DVD to improve or replace the traditional DVD-R.

The commercial laser-reading wavelength of HD-DVD is now 405 nm, which is a more precise laser beam suitable for high-density recording capacity. However, the reading wavelength of traditional CD-R or DVD-R is 780 nm or 650 nm, which is pretty different from those of HD-DVD. Therefore, the traditional organic materials, such as cyanine, azo and phthalocyanin, used as a radiation-absorbing dye in recording layer are not suitable for novel HD-DVD anymore.

Therefore, it is desirable to provide compounds for recording media and high-density optical recording media thereof to mitigate and/or obviate the aforementioned problems.

SUMMARY OF THE INVENTION

The object of the present invention is to provide a compound used as the recording materials of high-density optical recording media; said compound adsorbs the laser beam with a wavelength ranging from 400 to 450 nm and is suitable for the blue laser pickup head. Furthermore, it can serve as a high-density optical recording medium.

Another object of the present invention is to provide a high-density optical recording medium, which adsorbs the laser beam with wavelength ranging from 400 to 450 nm and is suitable for the blue laser pickup head. Furthermore, it can serve as a high-density optical recording medium.

Still another object is to provide a process for manufacturing high-density optical recording medium, which adsorbs the laser beam with a wavelength ranging from 400 to 450 nm and is suitable for the blue laser pickup head. Furthermore, it can serve as a high-density optical recording medium.

To achieve the object, the compound of the present invention includes the structure as formula (I):

wherein each $A_1$ and $A_2$ independently is selectively substituted $C_5$ to $C_{20}$ aryl or heteroaryl, said aryl or heteroaryl is selectively substituted by one or multiple functional groups; $R_1$ and $R_2$ independently is H, halogen, $C_1$ to $C_{10}$ alkyl or aryl; n is an integral ranging from 1 to 4; and n' is an integral ranging from 0 to 4.

The present invention also provides another compound comprising the structure as formula (II) and used as recording materials of high-density optical recording media:

wherein each $A_3$ and $A_4$ independently is selectively substituted $C_5$ to $C_{20}$ aryl or heteroaryl, said aryl or heteroaryl is selectively substituted by one or multiple functional groups; $R_1$ and $R_2$ is hydrogen, halogen, or $C_1$ to $C_{10}$ alkyl or aryl; B is Ar or n is an integral ranging from 1 to 4; and n' is an integral ranging from 0 to 4.

The high-density optical recording media of the present invention mainly comprises a substrate having at least one groove; a recording layer on said substrate, said recording layer comprising a compound as formula (I) or (II):

wherein each $A_1$, $A_2$, $A_3$, and $A_4$ independently is selectively substituted $C_5$ to $C_{20}$ aryl or heteroaryl, said aryl or heteroaryl is selectively substituted by one or multiple functional groups; $R_1$ and $R_2$ independently is H, halogen, $C_1$ to $C_{10}$ alkyl or aryl; B is Ar or n is an integral ranging from 1 to 4; and n' is an integral ranging from 0 to 4; and at least one cover layer on said recording layer; wherein said recording layer is located between said substrate and said cover layer.

The process for manufacturing the high-density optical recording media of the present invention mainly comprises the following steps of providing a substrate having at least one groove first, then providing a compound comprising the structure as formula (I) or (II):

-continued wherein each $A_1$, $A_2$, $A_3$, and $A_4$ independently is selectively substituted $C_5$ to $C_{20}$ aryl or heteroaryl, said aryl or heteroaryl is selectively substituted by one or multiple functional groups; $R_1$ and $R_2$ independently is H, halogen, $C_1$ to $C_{10}$ alkyl or aryl; B is Ar or n is an integral ranging from 1 to 4; and n' is an integral ranging from 0 to 4. Said compound is dissolved in an organic solvent or polymeric solution to form a derivative solution which is then coated on said substrate and dried to form a recording layer. Finally, a cover layer is coated onto said recording layer.

Other objects, advantages, and novel features of the invention will become more apparent from the following detailed description when taken in conjunction with the accompanying drawings.

DETAILED DESCRIPTION OF THE PREFERRED EMBODIMENT

The $A_1$, $A_2$, $A_3$, and $A_4$ of the compound used as recording materials of high-density optical recording media of the present invention independently is selectively substituted $C_5$ to $C_{20}$ aryl or heteroaryl, such as phenyl, benzoyl, fluorenyl, naphthyl, indolyl, benzoindolyl, benzothiophenyl, and phenol. Said substituted group is $C_1$ to $C_{10}$ alkyl, $C_1$ to $C_{10}$ alkoxy, nitro, halogen, diethoxymethyl, dialkylamino, cycloalkyl and cyano; wherein phenyl, methoxyphenyl, methylphenyl, isopropylphenyl, isobutylpheyl, fluorenyl, diethoxymethylphenyl, ethylaminophenyl, N-2-methylphenyl, t-butylphenyl, cyclohexylphenyl, cyanophenyl, naphthyl or benzothiophenyl is preferred. The n of the compound used as storage medium of high-density optical disc of the present invention is an integral ranging from 1 to 4; preferably is 1 to 2. The n' of the compound used as storage medium of high-density optical disc of the present invention independently is an integral ranging from 0 to 4; preferably is 0 to 2. The solvent used in the process for manufacturing the high-density optical recording media of the present invention is not limited; preferably it is alcohol, ketone, ether, alkene, alkane or ester, more preferably it is Alcohol or ketone. The process for manufacturing the high-density optical recording media of the present invention mainly comprising the following steps:

(A) providing a substrate having at least one groove;

(B) providing a compound comprising the structure as formula (I) or (II):

wherein each $A_1$, $A_2$, $A_3$, and $A_4$ independently is selectively substituted $C_5$ to $C_{20}$ aryl or heteroaryl, said aryl or heteroaryl is selectively substituted by one or multiple functional groups; $R_1$ and $R_2$ independently is H, halogen, alkyl or aryl; B is Ar or n is an integral ranging from 1 to 4; and n' is an integral ranging from 0 to 4;

(C) dissolving said compound in an organic solvent or polymeric solution to form a derivative solution;

(D) coating said derivative solution on said substrate and drying it to form a recording layer; and (E) coating a cover layer onto said recording layer.

Preferably, it further comprises step (D') forming a reflective layer before or next to step (D). The $A_3$ and $A_4$ group of the compound (II) can be selectively substituted $C_5$ to $C_{20}$ aryl or heteroaryl. Preferably, $A_3$ and $A_4$ group of the compound (II) is phenyl or alkyl-substituted benzoyl group.

EXAMPLE 1

Synthesis of 1-(4-methoxy-phenyl)-5-phenyl-penta-2,4-diene-1-one (compound 1)

Figure 1:
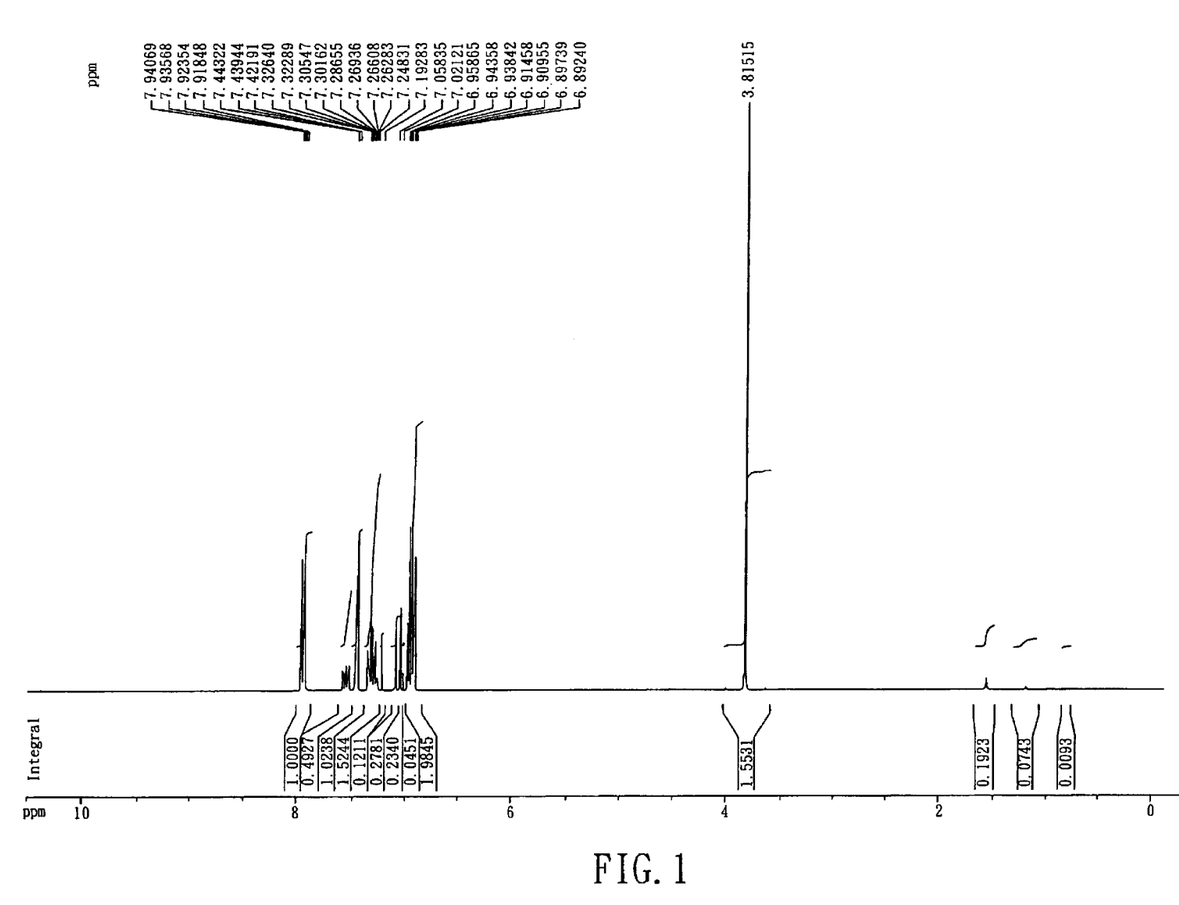
FIG. 1 is the NMR spectrum of compound 1.
Figure 2:
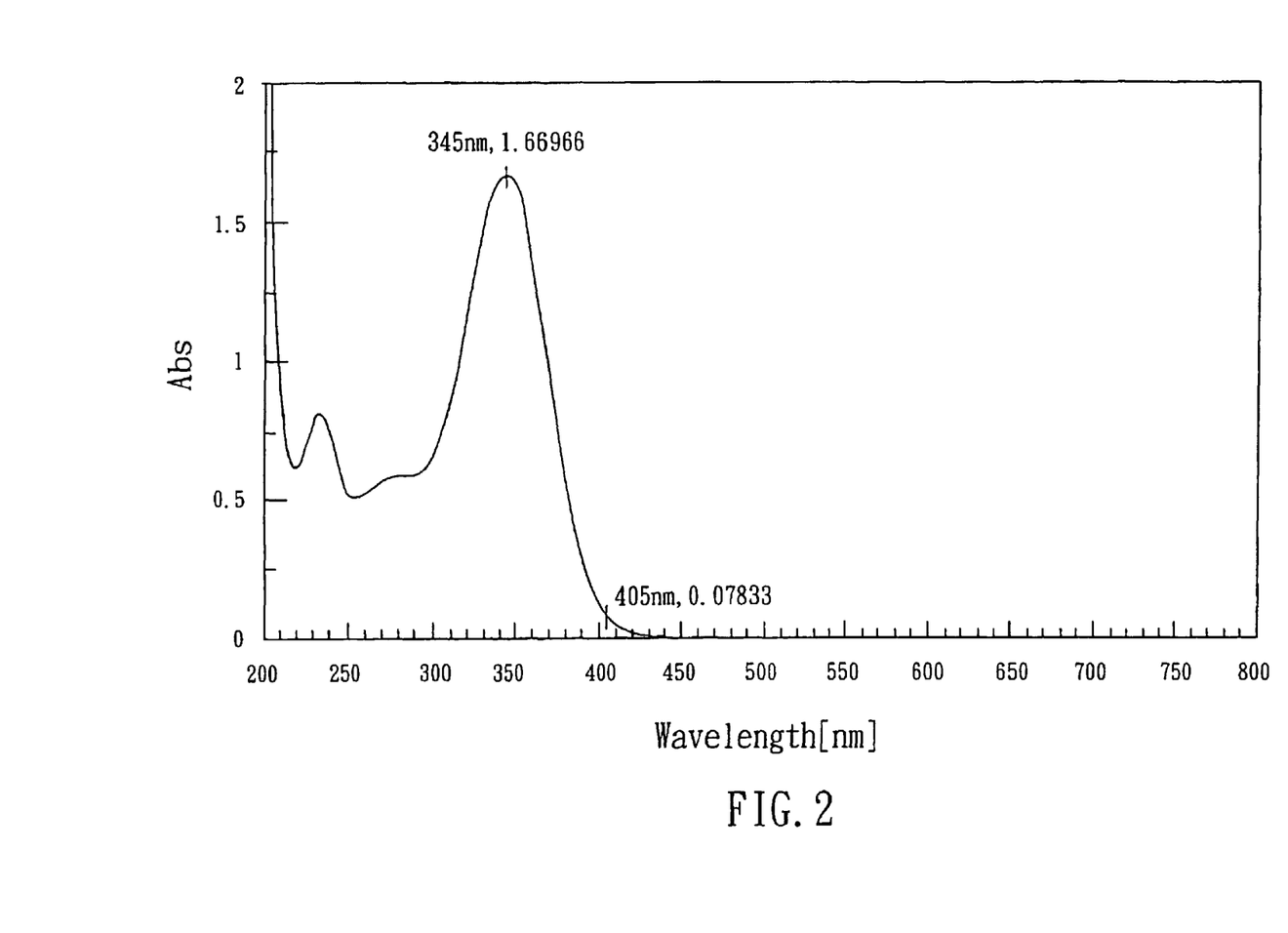
FIG. 2 is the UV spectrum of compound 1.

2 ml of trans-cinnamaldehyde and 2.5 g of 4-methoxy acetophenone were dissolved in 50 ml of ethanol at room temperature. 10 ml of sodium hydroxide solution was then added and stirred for 12 h to form yellow solid precipitation. Filtering the precipitation to obtain the compound 1, with yield of 72% and purity of 96.3%. FIG. 1 and FIG. 2 respectively show the NMR and UV spectrum of compound 1; wherein the maximum adsorptive wavelength of compound 1 is 345 nm, and the adsorptive coefficient $\epsilon$ is $4.5 \times 10^4$, both listed on Table 1.

EXAMPLE 2

Synthesis of 1-(2-benzothiophene)-4-pentyl-5-phenyl-penta-2,4-diene-1-one (compound 10)

Figure 3:
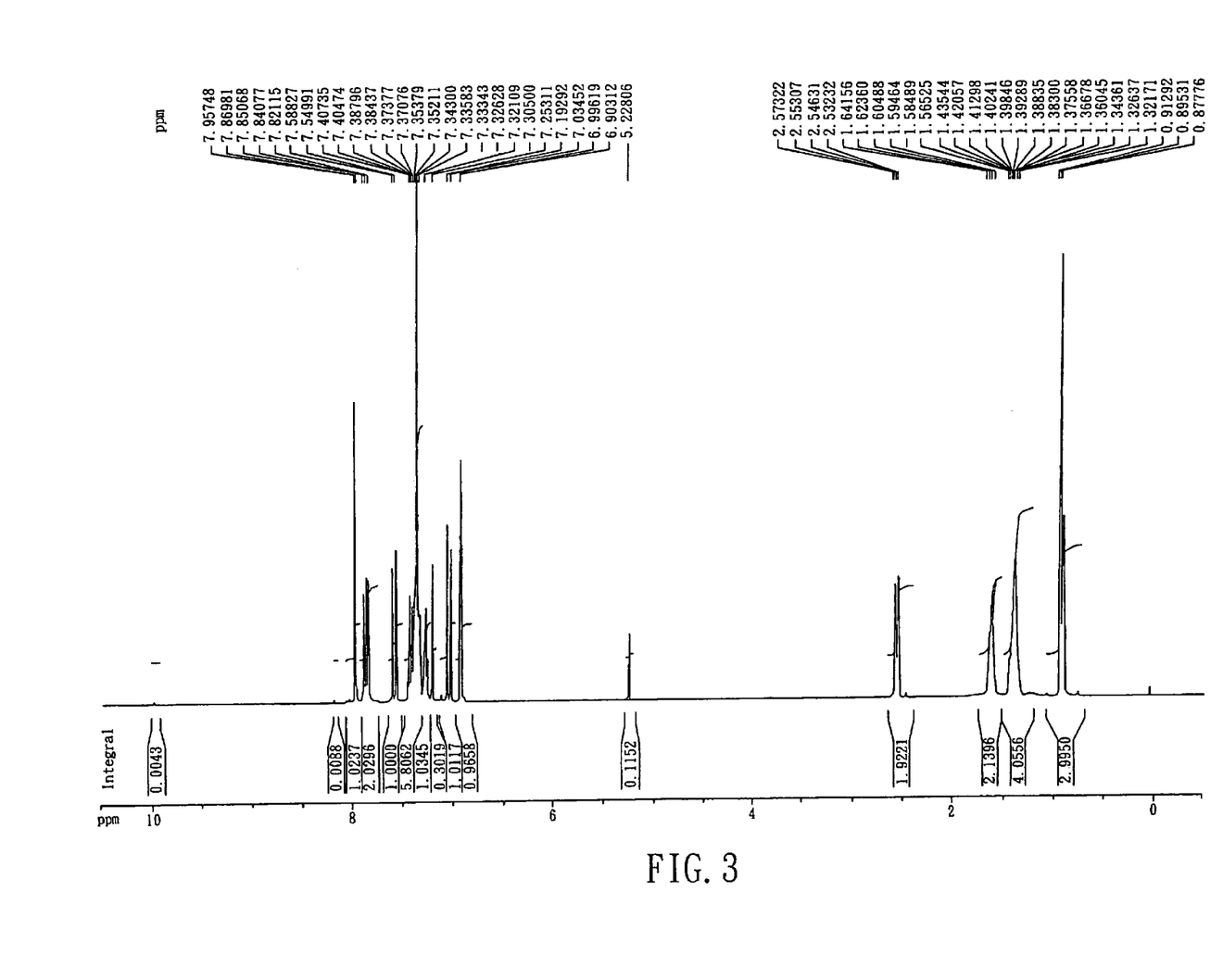
FIG. 3 is the NMR spectrum of compound 10.
Figure 4:
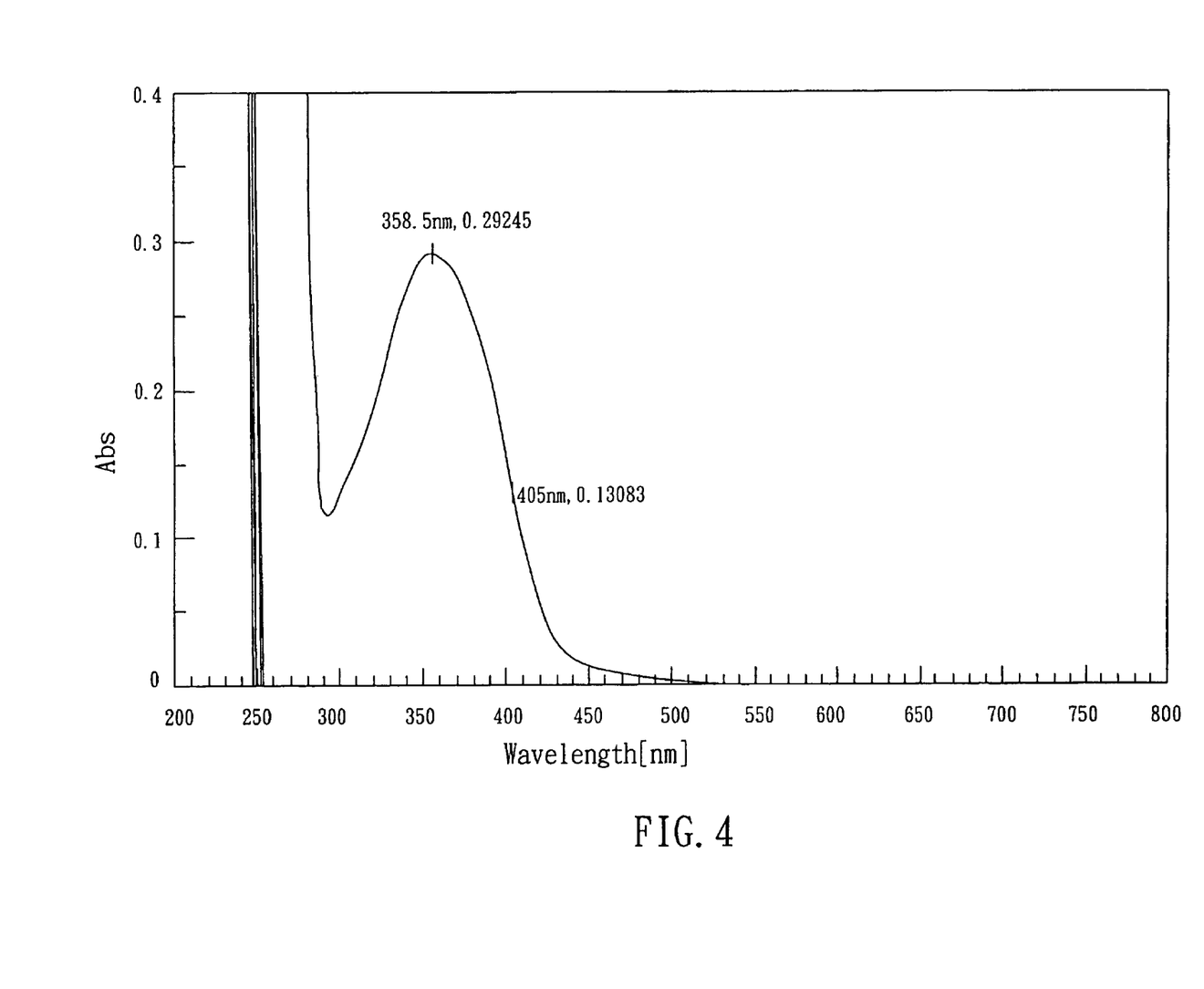
FIG. 4 is the UV spectrum of compound 10.

2.5 g of amyl cinnamic aldehyde and 2 g of 2-acetyl benzothiopene were dissolved in 50 ml of ethanol at room temperature. 10 ml of sodium hydroxide solution was then added and stirred for 12 h to form yellow solid precipitation. Filtering the precipitation to obtain the compound 10, with a yield of 63% and purity of 93%. FIG. 3 and FIG. 4 respectively show the NMR and UV spectrum of compound 10; wherein the maximum adsorptive wavelength of compound 10 is 358.5 nm, and the adsorptive coefficient $\epsilon$ is $4.2 \times 10^4$, both listed on Table 1.

EXAMPLE 3

Synthesis of 3-(4-methoxy phenyl)-1-naphthalen-2-yl-propenone (compound 14)

Figure 5:
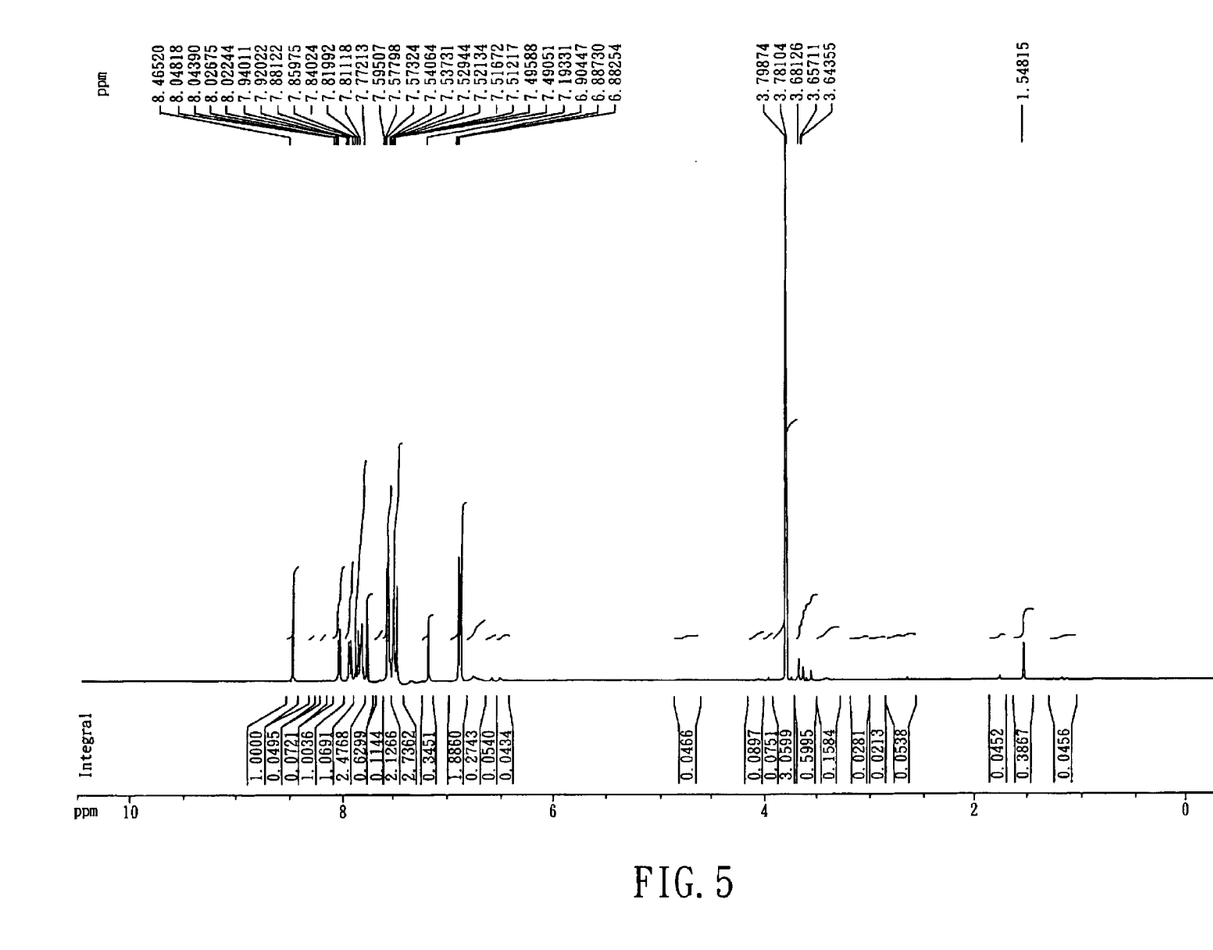
FIG. 5 is the NMR spectrum of compound 14.
Figure 6:
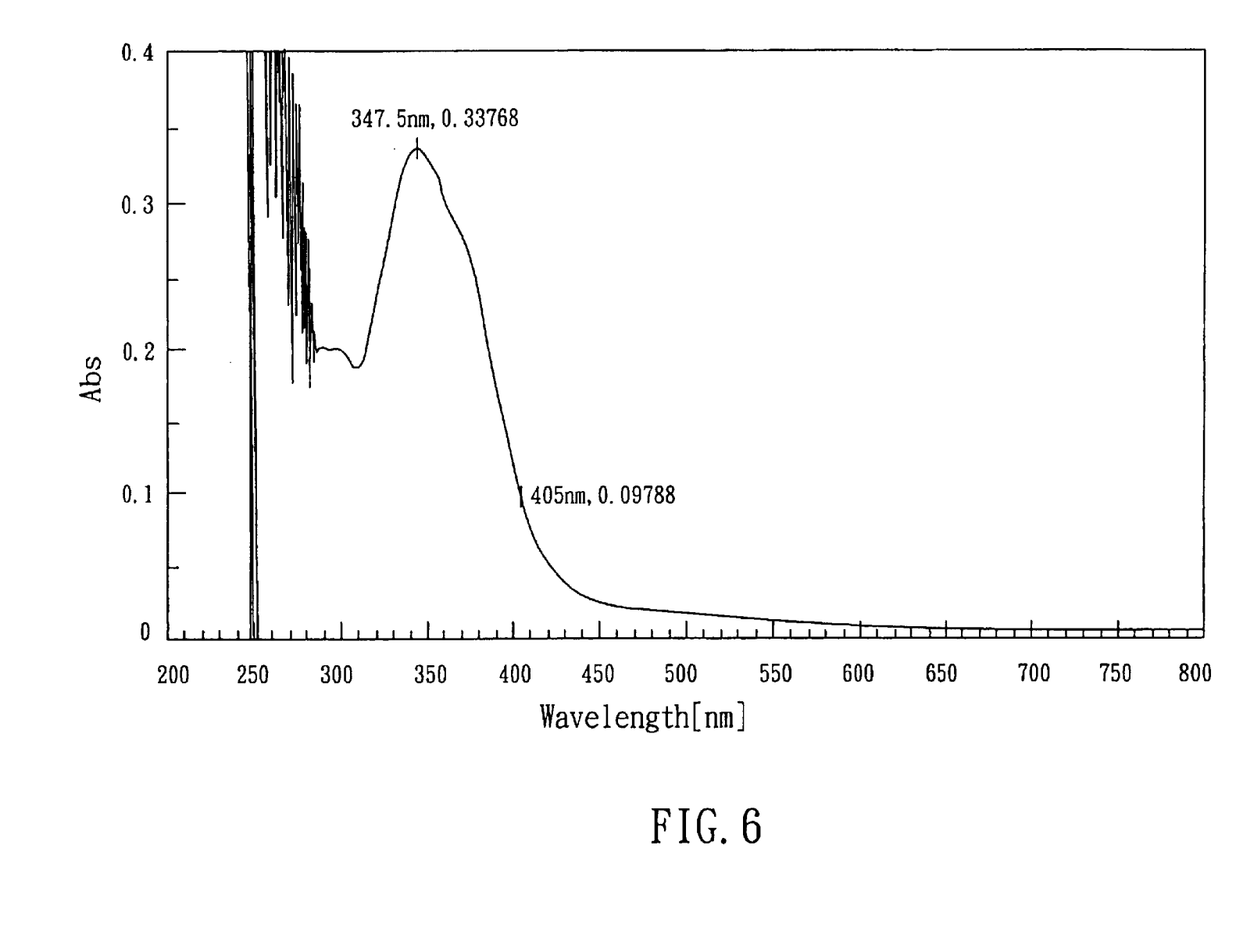
FIG. 6 is the UV spectrum of compound 14.

2 g of p-anisaldehyde and 2 g of 2-acetonaphthone were dissolved in 50 ml of ethanol at room temperature. 10 ml of sodium hydroxide solution was then added and stirred for 12 h to form yellow solid precipitation. Filtering the precipitation to obtain the compound 14, with yield of 70% and purity of 85%. FIG. 5 and FIG. 6 respectively show the NMR and UV spectrum of compound 14; wherein the maximum adsorptive wavelength of compound 14 is 347.5 nm, listed on Table 1.

EXAMPLE 4

Following the process described in example 1 to 3, various reactants were used for synthesis of their corresponding products in Table 1. Their NMR and UV spectrums were measured to identify their maximum adsorptive wavelength.

The structures of these products are identified by NMR spectrum. Moreover, the UV spectrums show that the adsorptive wavelengths of these products locate around 405 nm. In other words, the reading wavelengths of the HD-DVD coated by these compounds are also around 405 nm. Hence, we can understand that these products are excellent compounds functioning as recording materials of high-density optical recording media.

EXAMPLE 5

Process for Manufacturing High-density Blue-light Optical Recording Media with Traditional Structure (HD-DVD-R)

Figure 7:
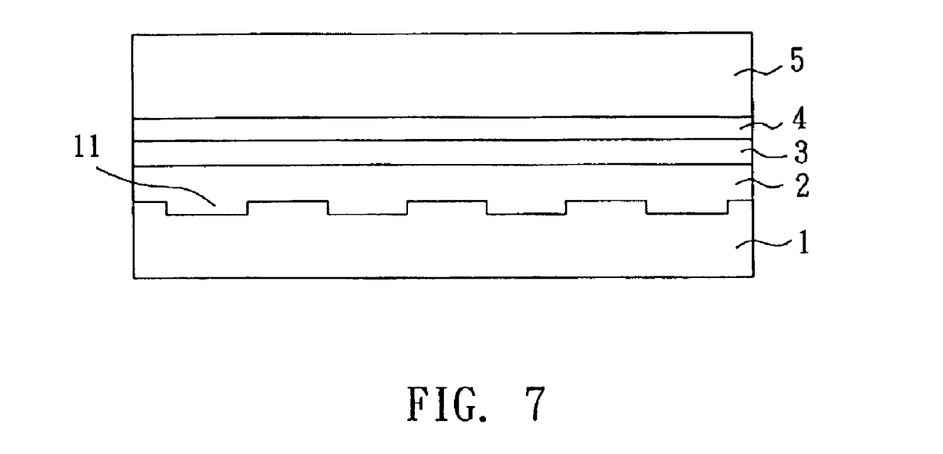
FIG. 7 is the prospective view of the high-density blue light discs of the present invention.

2.0 g of the compound in table 1 was dissolved in a solvent, such as 2,2,3,3-tetrafluoropropanol, dimethyl cyclohexane, dimethyl-4-heptone, or Dye-In-Polymer, to form 100 g of solution. Said solution was coated on the Substrate 1 by conventional coating method, as shown in FIG. 7. The thickness of the substrate 1 having lands and grooves 11 is 0.6 mm. The track pitch of the substrate ranges from 0.3 to 0.4 μm. The substrate 1 was then dried to form a recoding layer 2 with a 50 to 200 nm thickness. The whole thickness of the coated recording layer can be adjusted by the amount of coating solution. The material of reflective layer was subsequently sputtered on recording layer 2 to form a reflection layer 3, and a transparent substrate 5 with thickness of 0.6 mm was then bonded on reflection layer 3. Said bonding was performed by spin coating method, screen printing method, or hot melt application method bonding layer 4 was thus formed between reflection layer 3 and transparent substrate 5, and a HD-DVD-R with thickness of 120 mm was thus obtained.

EXAMPLE 6

Figure 8:
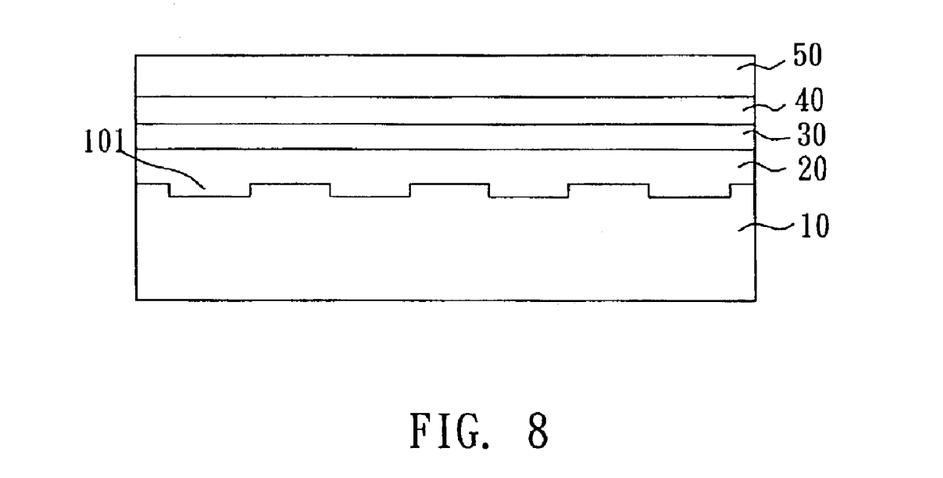
FIG. 8 is the prospective view of the high-density blue light DVR of the present invention.

Process for Manufacturing High-density Blue-light Optical Recording Media with DVR Structure Please refer to FIG. 8, the material of reflection layer was sputtered on the substrate 10 to form the reflective layer 20. Substrate 10 has lands and groove 101 while its thickness is 1.1 mm. The track pitch of the substrate 10 ranges from 0.3 to 0.4 μm. 2.0 g of the compound in table 1 was dissolved in a solvent, such as 2,2,3,3-tetrafluoropropanol, dimethyl cyclohexane, dimethyl-4-heptone, or Dye-In-Polymer, to form 100 g of solution. Said solution was coated on the reflection layer 20 of the sputtered substrate 10 to form a recording layer 30. A transparent dielectric material layer 40 with thickness of 5 to 50 nm was then sputtered on the recording layer 30, and a cover layer 50 with thickness of 0.1 mm was subsequently coated on the dielectric material layer 40. After this step, a high-density blue-light optical recording medium was thus obtained.

The reflective ratio of the high-density blue-light optical recording media of the present invention measured at 405 nm is above 45%, which is much higher than those of traditional optical recording media. This shows the optical recording media of the present invention own high-density recording ability, comparing to traditional optic discs, and much higher recording capacity.

Although the present invention has been explained in relation to its preferred embodiment, it is to be understood that many other possible modifications and variations can be made without departing from the spirit and scope of the invention as hereinafter claimed.

TABLE 1

| Number | Structure | UVλmax(nm) solution | film | ε |
|---|---|---|---|---|
| The maximum adsorptive wavelength (UVλmax) of various compounds ||||| 
| 1 | | 345 | | $4.5 \times 10^4$ |
| 2 | | 371 | 372.5 | $4.75 \times 10^4$ |

TABLE 1-continued

| Number | Structure | UV λmax(nm) solution | film | ε |
|--------|-----------|----------------------|------|---|
| 3 | | 306.5 | 342.5 | $5.44 \times 10^4$ |
| 4 | | 321 | 315 | $3.06 \times 10^4$ |
| 5 | | 316.5 | | |
| 6 | | 424.5 | | |
| 7 | | 392.5 | | |
| 8 | | 323 | | |

TABLE 1-continued

| Number | Structure | UVλmax(nm) solution | film | ε |
|---|---|---|---|---|
| 9 | | 323 | | |
| 10 | | 358.5 | | 4.2 × 10⁴ |
| 11 | | 428 | | |
| 12 | | 384.5 | | |
| 13 | | 387 | | |

TABLE 1-continued

| Number | Structure | UVλmax(nm) solution | film | ε |
|---|---|---|---|---|
| 14 | | 347.5 | | |
| 15 | | 298.5 | | |
| 16 | | 306 | | |
| 17 | | 335.5 | | |
| 18 | | 359.5 | | |
| 19 | | 355.5 | | |

TABLE 1-continued

| Number | Structure | UVλmax(nm) solution | film | ε |
|---|---|---|---|---|
| 20 |  | | 339.5 | |

What is claimed is:

1. A compound used as storage media of high-density optical recording media comprising the structure of formula (II):

$$A_3-(C=C)_n-B-(C=C)_{n'}-A_4 \quad (II)$$

wherein each $A_3$ and $A_4$ independently is selectively substituted $C_5$ to $C_{20}$ aryl or heteroaryl, said aryl or said heteroaryl is selectively substituted by one or multiple functional groups; B is Ar, and n is an integer ranging from 1 to 4 and n' is an integer ranging from 0 to 4.

2. The compound as claimed in claim 1, wherein each $A_3$ and $A_4$ is independently selected from the group consisting of substituted phenyl, benzoyl, fluorenyl, naphthyl, indolyl, benzoindolyl, benzothiophenyl, and phenol; and said substituted group is selected from the group consisting of $C_1$ to $C_{10}$ alkyl, $C_1$ to $C_{10}$ alkoxy, nitro, halogen, diethoxymethyl, dialkylamino, cycloalkyl and cyano.

3. The compound as claimed in claim 1, wherein n is an integer ranging from 1 to 2.

* * * * *